(12) United States Patent
Matthews

(10) Patent No.: US 6,890,225 B2
(45) Date of Patent: May 10, 2005

(54) AMPHIBIOUS VEHICLE

(76) Inventor: John Matthews, 599 Upper Wentworth Street, Hamilton, ON (CA), L9A 4V1

(*) Notice: Subject to any disclaimer, the term of this patent is extended or adjusted under 35 U.S.C. 154(b) by 0 days.

(21) Appl. No.: 10/455,336

(22) Filed: Jun. 6, 2003

(65) Prior Publication Data

US 2003/0236037 A1 Dec. 25, 2003

Related U.S. Application Data

(60) Provisional application No. 60/390,151, filed on Jun. 21, 2002.

(51) Int. Cl.$^7$ ................................................ B60F 3/00
(52) U.S. Cl. .................................. 440/12.5; 440/12.51
(58) Field of Search .......................... 440/12.52, 12.54, 440/12.56, 12.63, 12.66, 12.5, 12.51; 180/89.13, 89.1

(56) References Cited

U.S. PATENT DOCUMENTS

| 1,711,629 | A | * | 5/1929 | Wright | 180/313 |
| 1,752,200 | A | * | 3/1930 | Raimondi | 440/12.68 |
| 2,397,791 | A | * | 4/1946 | Kramer et al. | 440/12.57 |
| 2,400,132 | A | * | 5/1946 | Porter | 440/12.59 |
| 2,859,711 | A | * | 11/1958 | Track | 105/453 |
| 2,908,241 | A | * | 10/1959 | Todd | 114/344 |
| 3,026,841 | A | * | 3/1962 | Pender | 440/12.53 |
| 3,182,739 | A | * | 5/1965 | Cockerell | 180/118 |
| 3,626,891 | A | * | 12/1971 | Sessions | 440/11 |
| 4,330,149 | A | * | 5/1982 | Salmon | 296/190.05 |
| 5,553,911 | A | * | 9/1996 | Bodin et al. | 296/190.07 |
| 5,984,036 | A | * | 11/1999 | Higuchi et al. | 180/89.12 |
| 6,478,102 | B1 | * | 11/2002 | Puterbaugh et al. | 180/89.12 |

FOREIGN PATENT DOCUMENTS

| JP | 2000289425 | A | * | 10/2000 | ......... B60G/17/015 |
| JP | 2001187525 | A | * | 7/2001 | ............ B60G/9/04 |

* cited by examiner

Primary Examiner—S. Joseph Morano
Assistant Examiner—Ajay Vasudeva

(57) ABSTRACT

A vehicle which includes a lower chassis section including a means for rollably supporting the vehicle's weight on land, and a means for hydrodynamically supporting the vehicles weight on water, an upper passenger compartment section including a passenger compartment for housing at least one passenger and a frame for attaching drive line components thereto; a suspension section sandwiched between said passenger compartment and said chassis section, said suspension section including suspension elements for absorbing and smoothing bumps and irregularities encountered on road surfaces wherein said suspension elements include gas filled cushions extending around the periphery of said vehicle, wherein said cushions being disposed between said passenger compartment and said chassis section.

13 Claims, 14 Drawing Sheets

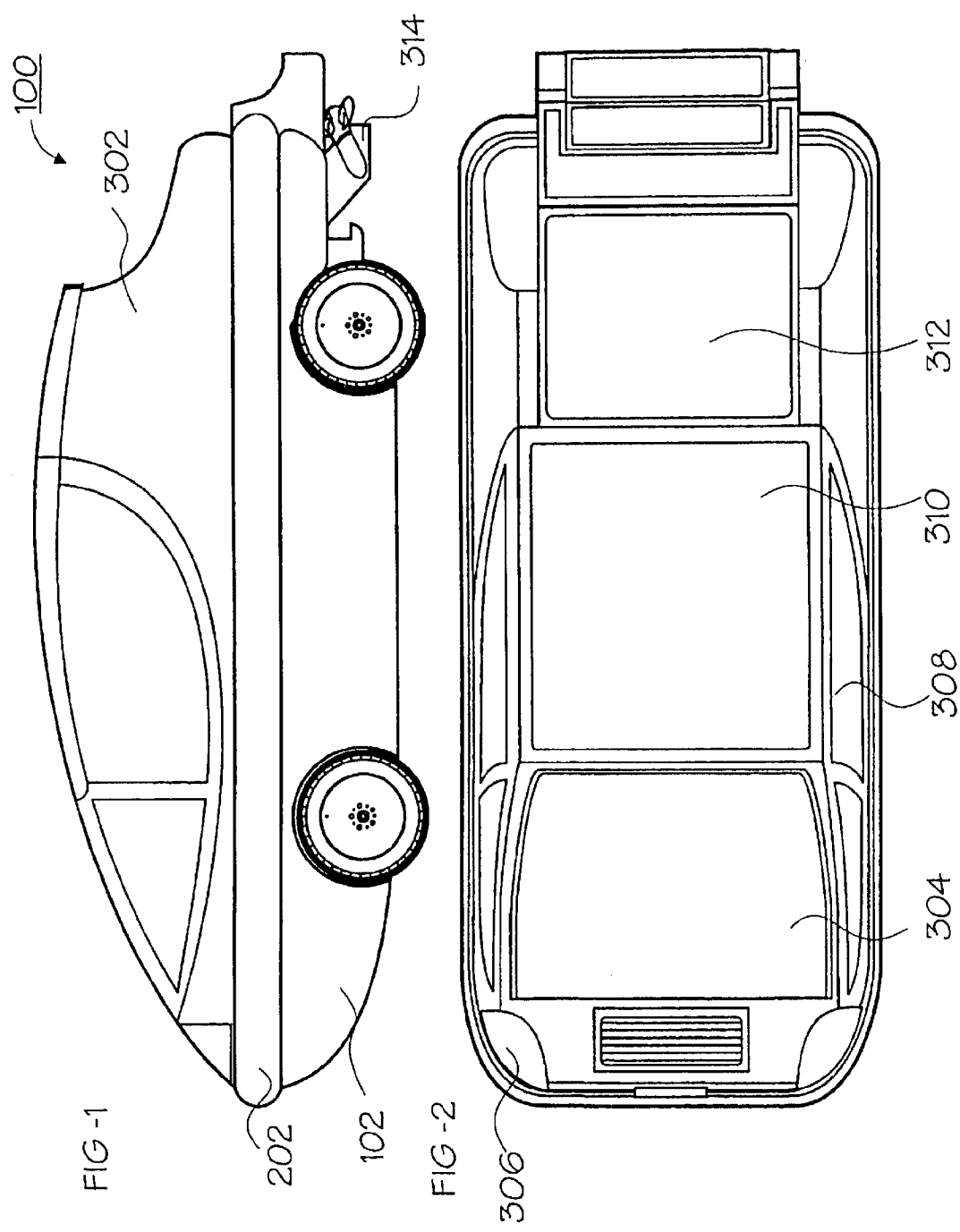

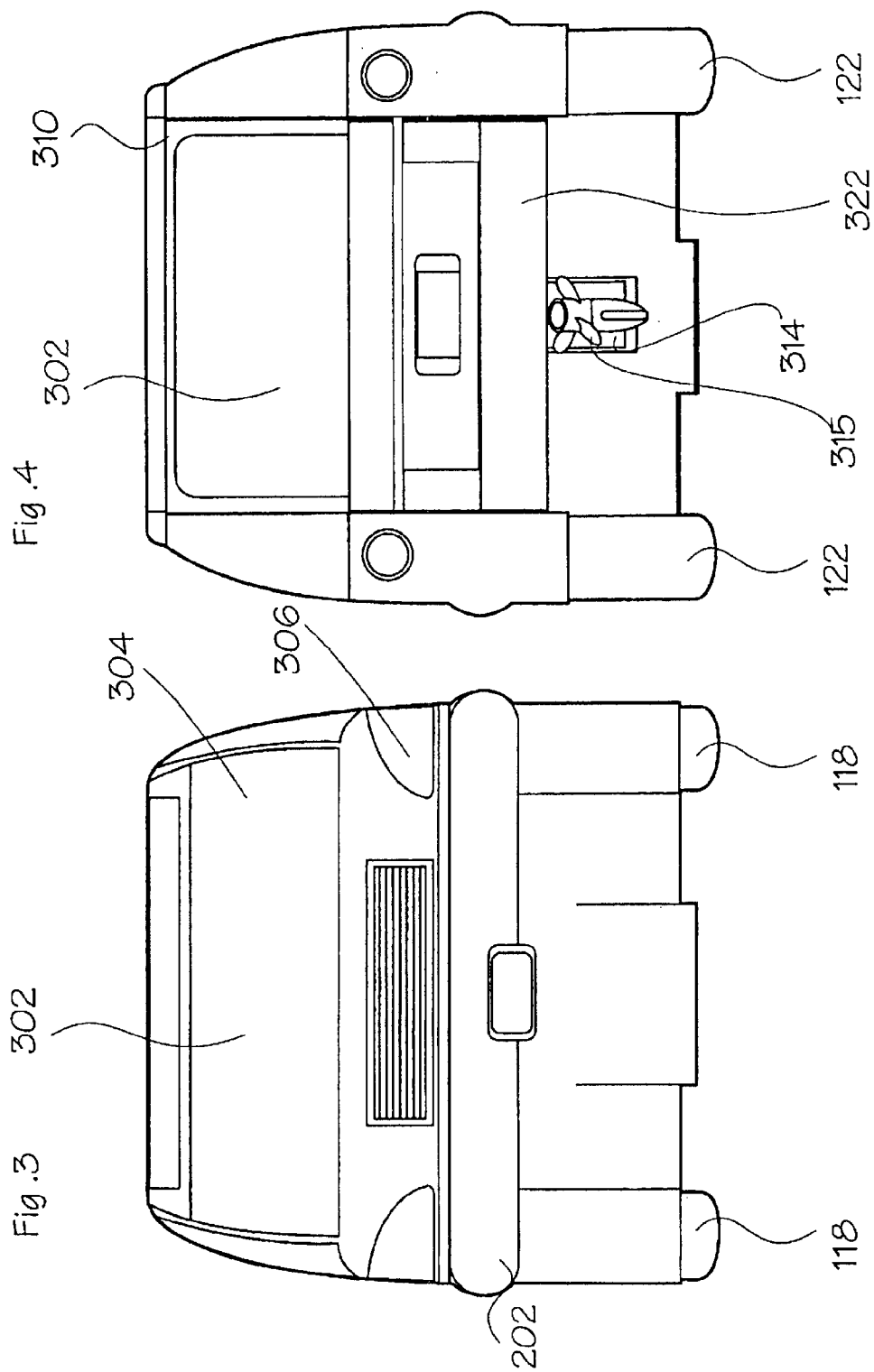

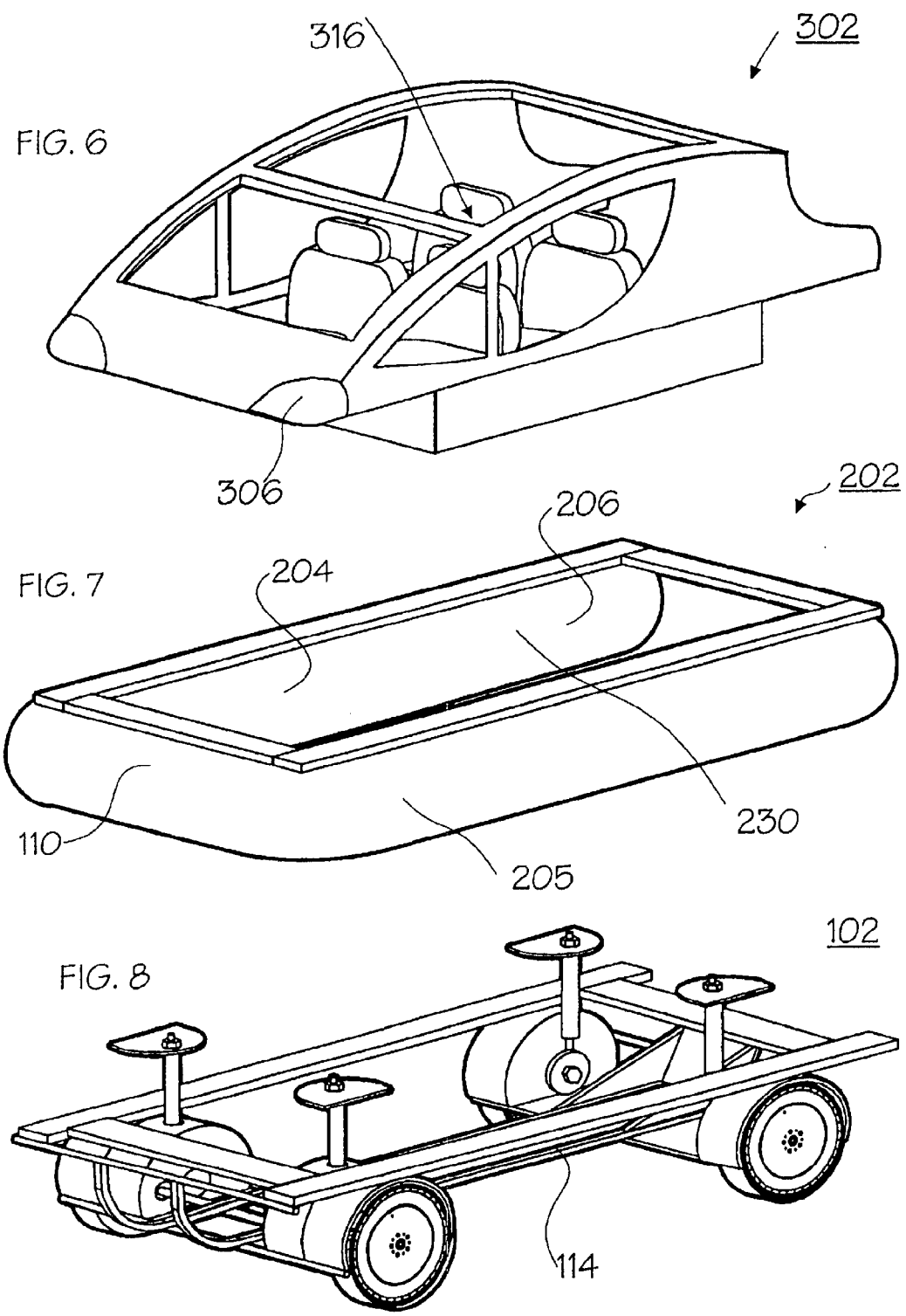

AMPHIBIOUS VEHICLE

This application claims the benefit of provisional Application No. 60/390151, filed Jun. 21, 2002.

FIELD OF THE INVENTION

The present invention relates to motorized vehicles and in particular relates to amphibious motorized vehicles.

BACKGROUND OF THE INVENTION

Motor vehicles have become one of the most popular modes of transportation and for the most part motor vehicles that are currently being sold are for use on land only. In the past there have been some amphibious vehicles designed and built and in particular the 1960's German produced "Amphicar" is one of the most well known amphibious vehicles that had some market success.

The military in particular has always had a need for amphibious vehicles and in particular amphibious vehicles have been used for both troop and equipment transport from water onto the land. The difficulty with amphibious vehicles is that the engineering requirements for adequate performance on land are often contra indicated to the requirements of a water based vehicle and compromises must be made in order to obtain some minimal standard of performance on land and water. One of the major obstacles that amphibious vehicles have faced is the unwanted resistance created by the road wheels immersed in water. Most road vehicles have sophisticated suspension systems allowing from anywhere between 6 to 18 inches of wheel travel within the wheel well in order to absorb major road bumps as the vehicle is travelling over a land surface. As a result when the vehicle is immersed in water, the springs or biassing portion of the suspension tends to push the wheels downward into the water creating a greater obstacle in the water when the vehicle is immersed. In order to overcome this problem, often very expensive and complicated mechanical retractable wheels and other systems have been used to elevate the wheels out of the water. This often leads to very sophisticated and expensive designs which become impracticle.

Amphibious vehicles to date that have had some market success generally have had very poor performance in water. This is likely as a result of the wheel resistance problem in the water and the complicated suspension systems required in order to provide both on land performance as well on water performance.

The inventor believes that the poor performance of amphibious vehicles in water environments has essentially lead to the demise of amphibious vehicles in the eyes of the public. Therefore, it would be desirable to have an amphibious vehicle which had good on road performance as well as on water performance and that would eliminate the on water suspension problems that have existed to date.

One object of this invention is provide for an amphibious vehicle in which the drag created by the road wheels is minimized while yet retaining adequate road performance.

It is another object of this invention to provide for an amphibious vehicle which provides good on road and on water performance in a safe and economical manner.

It is further an object of this invention to provide for a unique amphibious suspension system that minimizes drag, increases safety, decreases manufacturing costs and provides a solution to the long plagued problem of amphibious vehicles.

SUMMARY OF THE INVENTION

The present invention an amphibious vehicle for use on land and on water comprises:

a) a lower chassis section including a means for rollably supporting the vehicle's weight on land, and a means for hydrodynamically supporting the vehicles weight on water;

b) an upper passenger compartment section including a means for housing at least one passenger and a means for attaching drive line components thereto;

c) a suspension section sandwiched between said passenger compartment and said chassis section, said suspension section including a suspension means for absorbing and smoothing bumps and irregularities encountered on road surfaces or on water;

d) said drive line including a drive means for propelling said vehicle on land or on water.

Preferably wherein said suspension means includes a resilient member sandwiched between said passenger compartment and said chassis section.

Preferably said resilient member includes gas filled cushions extending around the periphery of said vehicle, wherein said cushions being disposed between said passenger compartment and said chassis section.

Preferably wherein said resilient members include air filled cushions extending around the periphery of said vehicle, wherein said cushions being disposed between said passenger compartment and said chassis section.

Preferably wherein said rolling means including wheels housed within wheel wells, wherein a clearance between said wheels and said wheel wells remains substantially constant.

Preferably wherein road or water irregularities are smoothed and absorbed by compression or expansion of said air filled cushions.

Preferably wherein said wheel wells are water tight preventing water from entering into a chassis cavity.

Preferably wherein front wheels are operatively adapted to turn for effecting steering control on land.

Preferably wherein said front wheel wells include deflector plates disposed behind each wheel for operatively deflecting water away from front wheel wells and to cooperatively turn in unison with said front wheels thereby minimizing the resistance to travelling through water.

Preferably wherein said drives means includes engine and transmission components hung from said passenger components by said attaching means wherein said engine and transmission disposed within a suspension cavity and chassis cavity defined by said suspension and chassis sections.

Preferably wherein said hydrodynamic means includes a flexible outer covering being a flexible membrane covering said chassis for preventing water entry into said vehicle and defining a water entry hull.

Preferably wherein said drive means includes a marine stern drive which is adapted to be lowered into water and propelling said vehicle on water.

Preferably wherein said drive means includes conventional drive components for turning said front wheels for propelling said vehicle on land.

Preferably wherein said air filled cushions are sandwiched between lower cushion supports attached to said chassis and upper cushion supports attached to said passenger compartment.

BRIEF DESCRIPTION OF THE DRAWINGS

The present invention will be described by way of example only with reference to the following drawings:

FIG. 1 is a schematic side elevational view of the present invention an amphibious vehicle.

FIG. 2 is a schematic top plan view of the present invention an amphibious vehicle.

FIG. 3 is a schematic front elevational view of the present invention an amphibious vehicle.

FIG. 4 is a schematic rear elevational view of the present invention an amphibious vehicle.

FIG. 6 is a schematic perspective partial view of the passenger compartment of the present invention.

FIG. 7 is a schematic perspective view of the suspension section of the present invention.

FIG. 8 is a schematic perspective view of the chassis portion of the present invention.

DETAILED DESCRIPTION OF THE PREFERRED EMBODIMENT

The present invention shown in FIGS. 1 through 16 is an amphibious vehicle shown generally as 100 and consists of the following major sections, namely chassis section 102, suspension section 202 and the passenger compartment section 302 as best depicted in FIGS. 1 and shown in exploded fashion in FIGS. 6, 7 and 8.

Chassis Section

Figure 5:
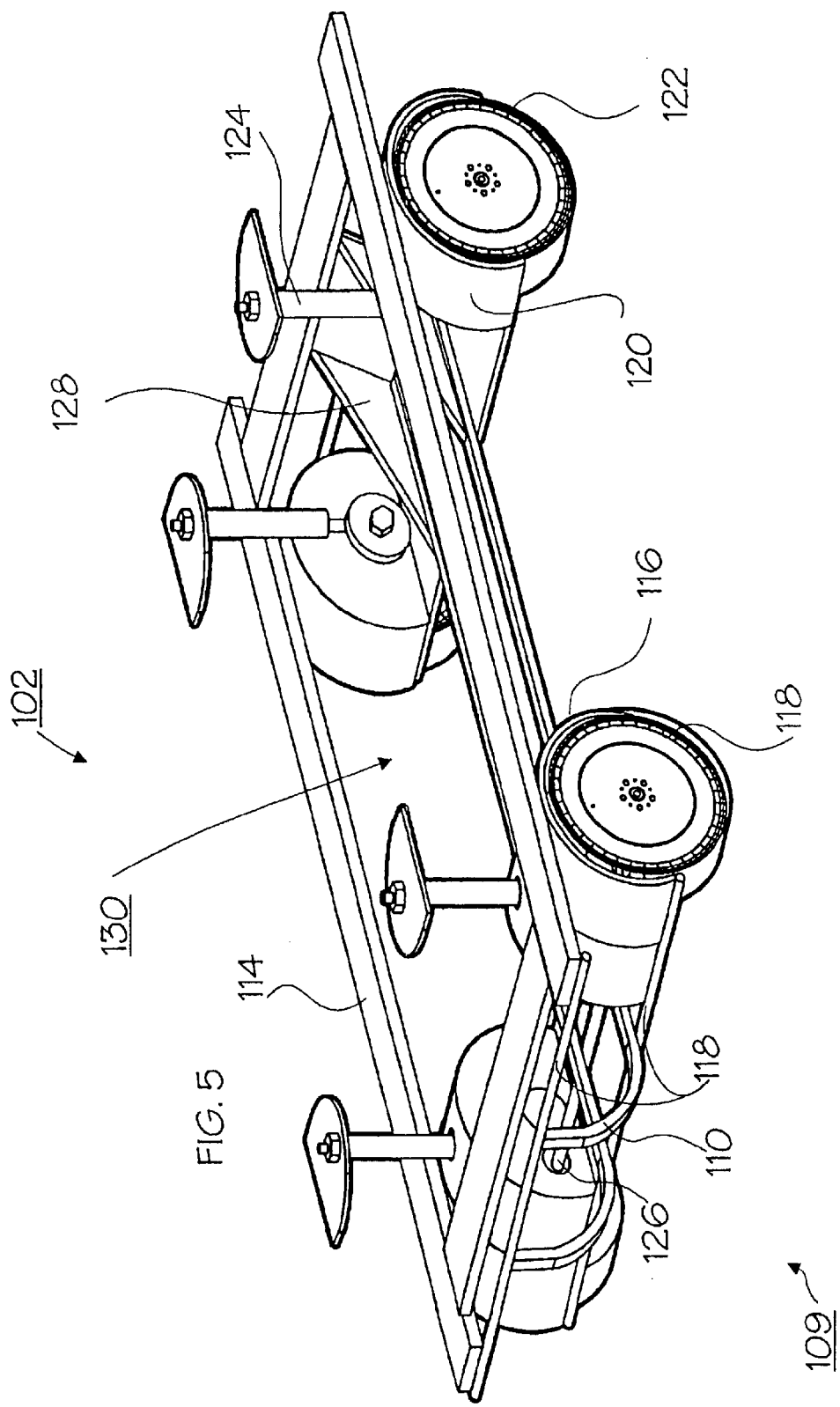
FIG. 5 is a schematic partial prospective view of the chassis portion of the present invention an amphibious vehicle.
Figure 9:
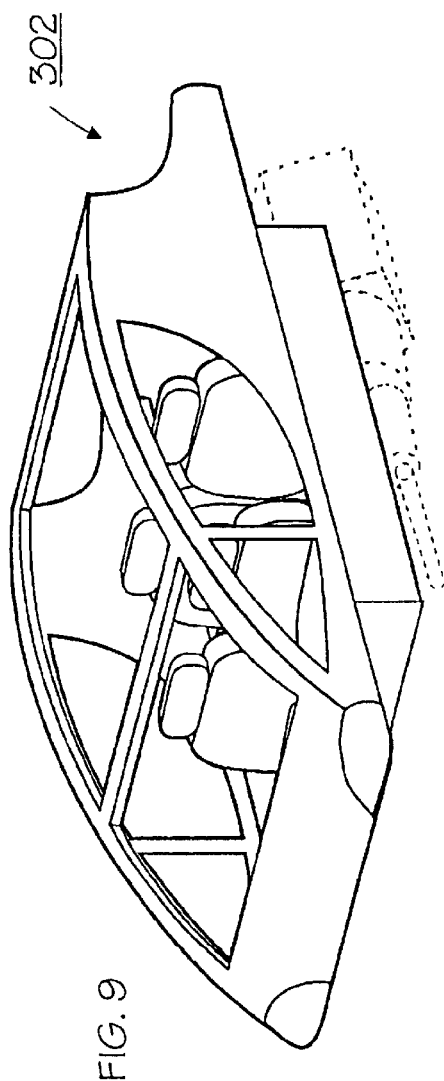
FIG. 9 is a schematic perspective view of the passenger compartment section.

Referring now particularly to FIG. 5 which is the schematic partial perspective view of the chassis section 102. Chassis section 102 includes the following major components, namely a ladder frame 109 which is comprised of longitudinal frame members 110 and lateral frame members 112. Chassis section 102 further includes lower cushion supports 114, front wheel wells 116, housing front wheels 118, rear wheel wells 120, housing rear wheels 122, shocks 124, stiffening members 128 and also shown is a steering control arm 126 for effecting steering response of front wheels 118.

A person skilled in the art will recognize that ladder frame members 112 of ladder frame 109 connect front wheel wells 118 and rear wheel wells 122 to ladder frame 109 and as well lateral frame members 112 and longitudinal frame members 110 connect lower cushion supports 114 to ladder frame 109. In addition, there are stiffening members 128 located in strategic locations where extra stiffening is required for the support of various drive line and suspension components.

Shocks 124 are connected via a lower shock flange 150 to axles 156 and at the upper sections via upper shock flanges 240 to upper cushion supports 204. Other than the shocks 124 the items depicted in FIG. 5 of chassis portion 102 represent the unsprung weight of amphibious vehicle 100. There are other items which are connected to chassis 102 which have been omitted for clarity sake which also contribute to the unsprung weight of chassis 102.

The stem drive portion 314 is mounted onto the rear portion of chassis 102. Stern drive 314 in the raised position is hung mounted to the passenger compartment 302 to reduce the unsprung weight.

Ladder frame 109 together with lower support cushions 114 defines a chassis cavity 130 centrally located and surrounded by longitudinal frame members and lateral frame members 112 as well as other stiffening members 128.

Figure 15:
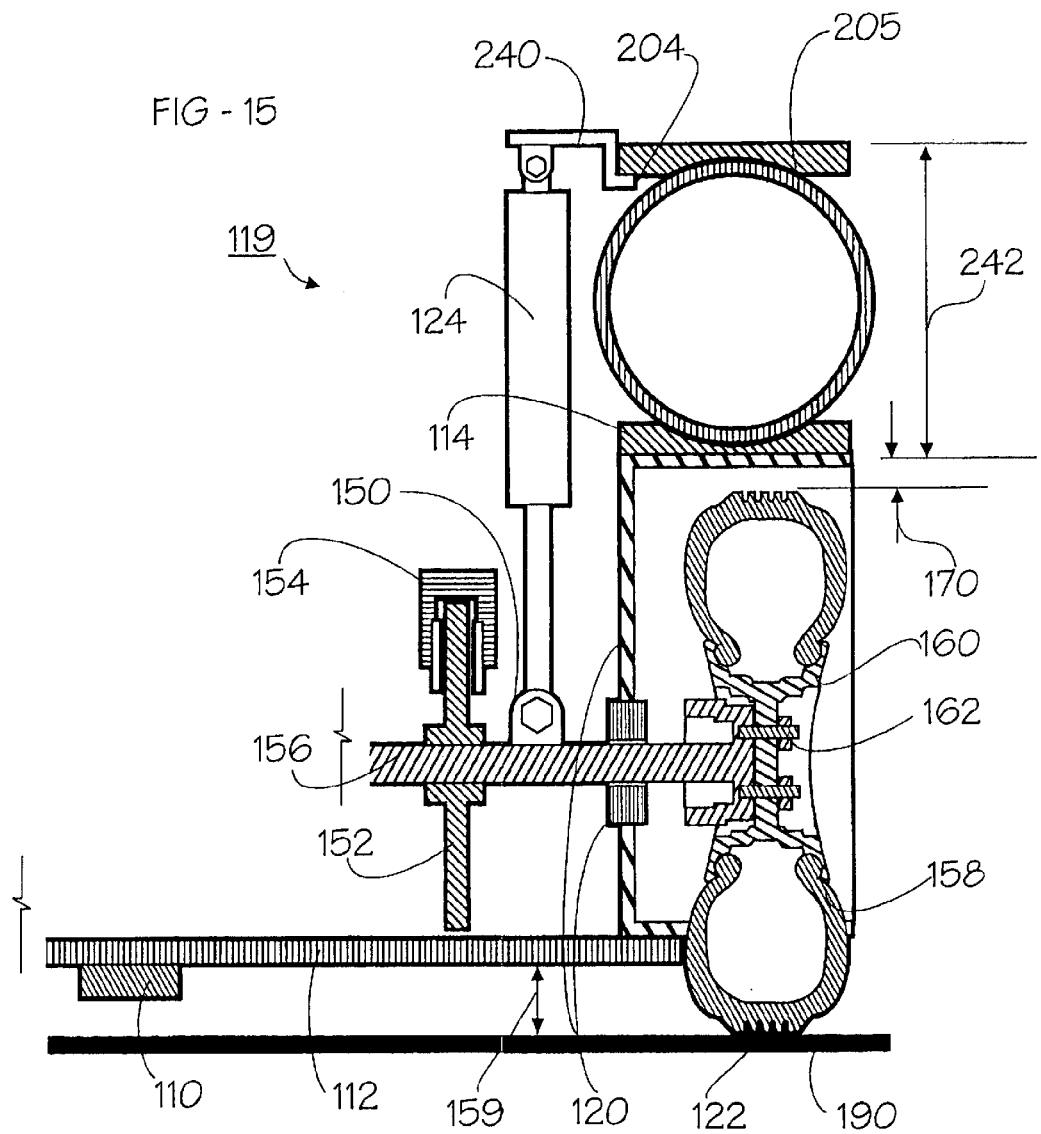
FIG. 15 is a schematic cross-sectional view taken through the rear axle with the tires travelling over a flat road surface. The cross section taken along lines 15—15 shown in FIG. 5.

Referring now to FIG. 15 which is a schematic cross-sectional view through the one of the rear axles and showing a typical suspension arrangement for amphibious vehicle 100. Suspension 119 includes cushion 205, upper cushions supports 204, shocks 124 connected with an upper shock flange 240 to upper cushion support 204 and to an axle 156 with lower shock flange 150. Rear wheel 122 includes tire 158 mounted onto a wheel rim 160 housed within a rear wheel well 120 and is isolated from water with a water proof seal 162. Rear wheel 122 is mounted onto axle 156 which also has rigidly mounted thereon a brake rotor together with brake caliper 154 to effect braking.

The distance between rear wheel well 120 and the top of tire 158 is defined as clearance 170 which is significantly less than in traditional vehicles since suspension travel does not occur between the rear wheel well 120 and the tire 158. The suspension travel extends between the extended position 242 shown in FIG. 15 and the compressed position 243 shown in FIG. 16. The entire rear wheel well 120 and rear wheel 122 move upwardly and downwardly in unison together with ladder frame 109. Therefore, clearance 170 remains substantially constant even when tire 158 encounters a bump or when the vehicle is immersed in water.

Suspension Section

Figure 10:
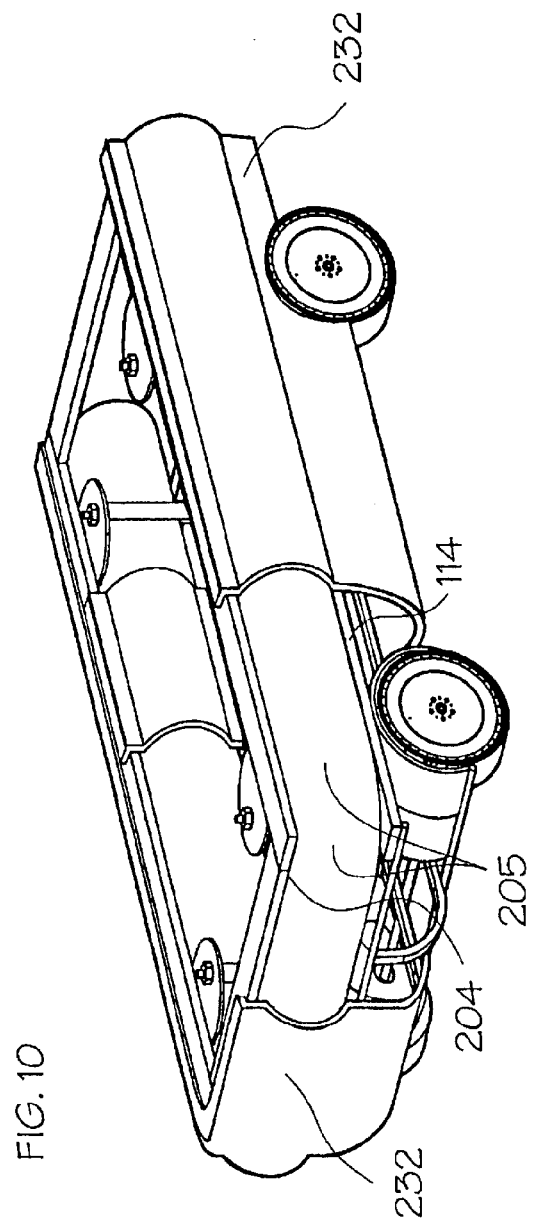
FIG. 10 is a schematic perspective view of the suspension section together with the chassis section.

Suspension section 202 is best viewed in FIG. 7 and also in FIG. 10. Suspension section 202 includes cushions 205 which are essentially air filled bladders which extended around the periphery of amphibious vehicle 100. Cushions 205 include lateral cushions 208 at the forward and optionally at the rearward section of suspension section 202 and longitudinal cushions 206 which extend along the outer periphery from front to back of amphibious vehicle 100 as shown in the drawings.

As best viewed in FIG. 10 cushions 205 are sandwiched between upper cushion supports 204 which rigidly connect the passenger compartment 302 to the suspension section 202 and at the bottom cushions 205 are supported by lower cushions supports 114 which connect the chassis section 102 to the suspension section 202.

Therefore, a person skilled in the art will see that the amphibious vehicle 100 consists of essentially three distinct portions, namely passenger compartment 302 as shown in FIG. 6, suspension portion 202 shown in FIG. 7 and chassis portion 102 shown in FIG. 8. The three sections are sandwiched together wherein the passenger compartment 302 is rigidly connected to the upper cushion supports 204 and the chassis section 102 is rigidly connected to the lower cushion supports 114. Suspension section 202 defines a suspension cavity 230 centrally located within and bounded by cushions 205 around the outer periphery.

Referring now to FIG. 10, suspension 202 as well as chassis 102 are covered with a flexible outer covering 232 which is a flexible outer membrane providing for a water proof covering encasing ladder frame 109 chassis section 102 as well as suspension 202 such that when amphibious vehicle 100 enters the water it provides for a water proof seal preventing water from entering into chassis cavity 130 or suspension cavity 230. Note that suspension cavity 230 is essentially an extension of and is in open communication with chassis cavity 130. In other words, suspension cavity 230 and chassis cavity 130 combined provide for a large cavity or opening beneath passenger compartment 302. Flexible outer covering 232 is securely connected to upper cushion supports 204 and encases the entire outer portions of suspension section 202 and the chassis section 102. A person skilled in the art will recognize that the non encased exposed portions are those components within front wheel wells 116 and rear wheel wells 122 and as well stern drive 314. Flexible covering 232 is designed to provide for a water tight seal preventing water from entering into the chassis cavity 130 and the suspension cavity 230. Flexible covering 232 forms a water tight hull around the mechanical components which flexes with the deflections of the chassis.

Passenger Compartment

Passenger compartment 302 includes front windshield 304, headlights 306, side windows 308, tilting roof 310 and entry platform 312 as best shown in FIGS. 1 and 2.

Figure 13:
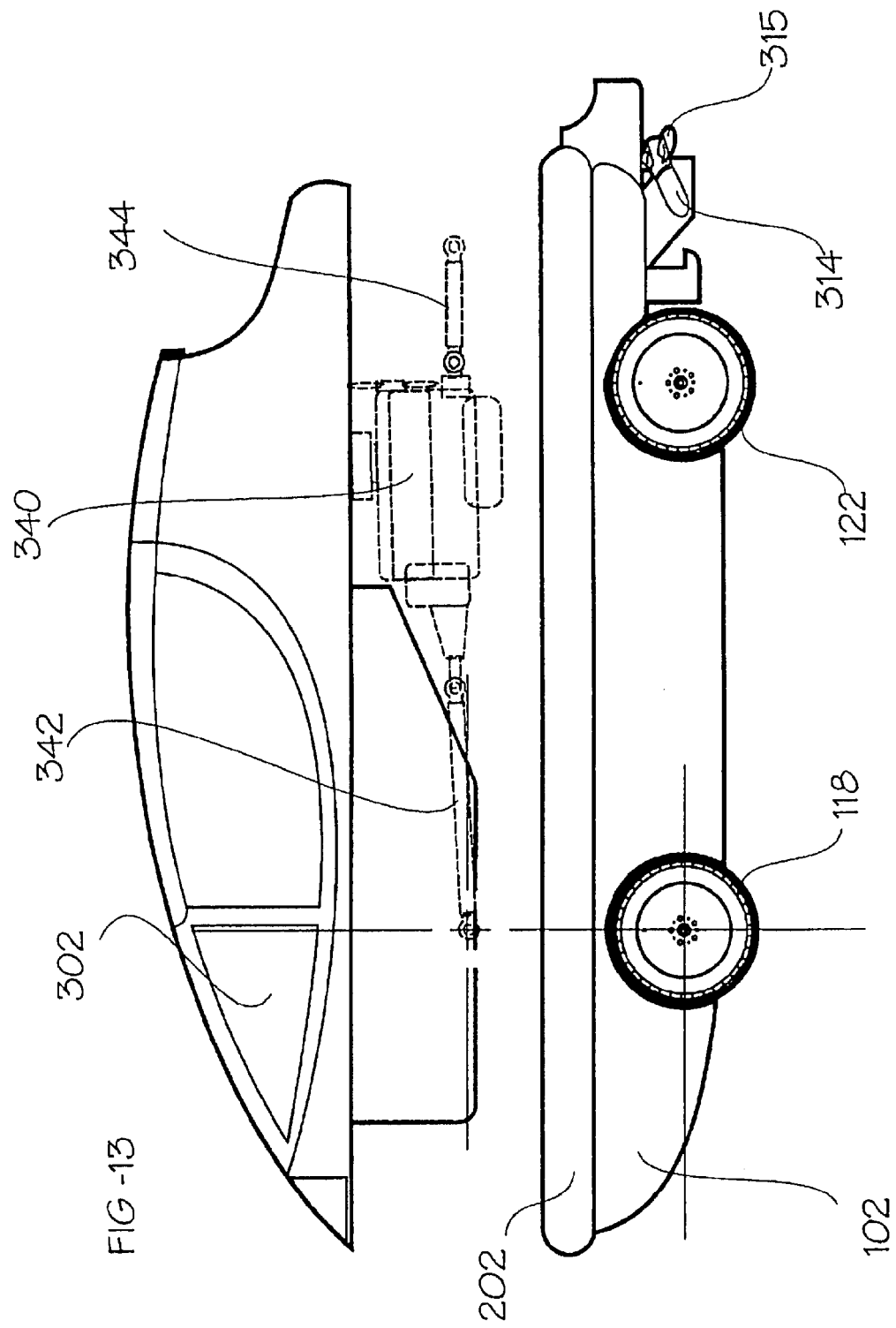
FIGS. 13 is a exploded view of the passenger compartment detached from the suspension section and the chassis section of the present invention.
Figure 14:
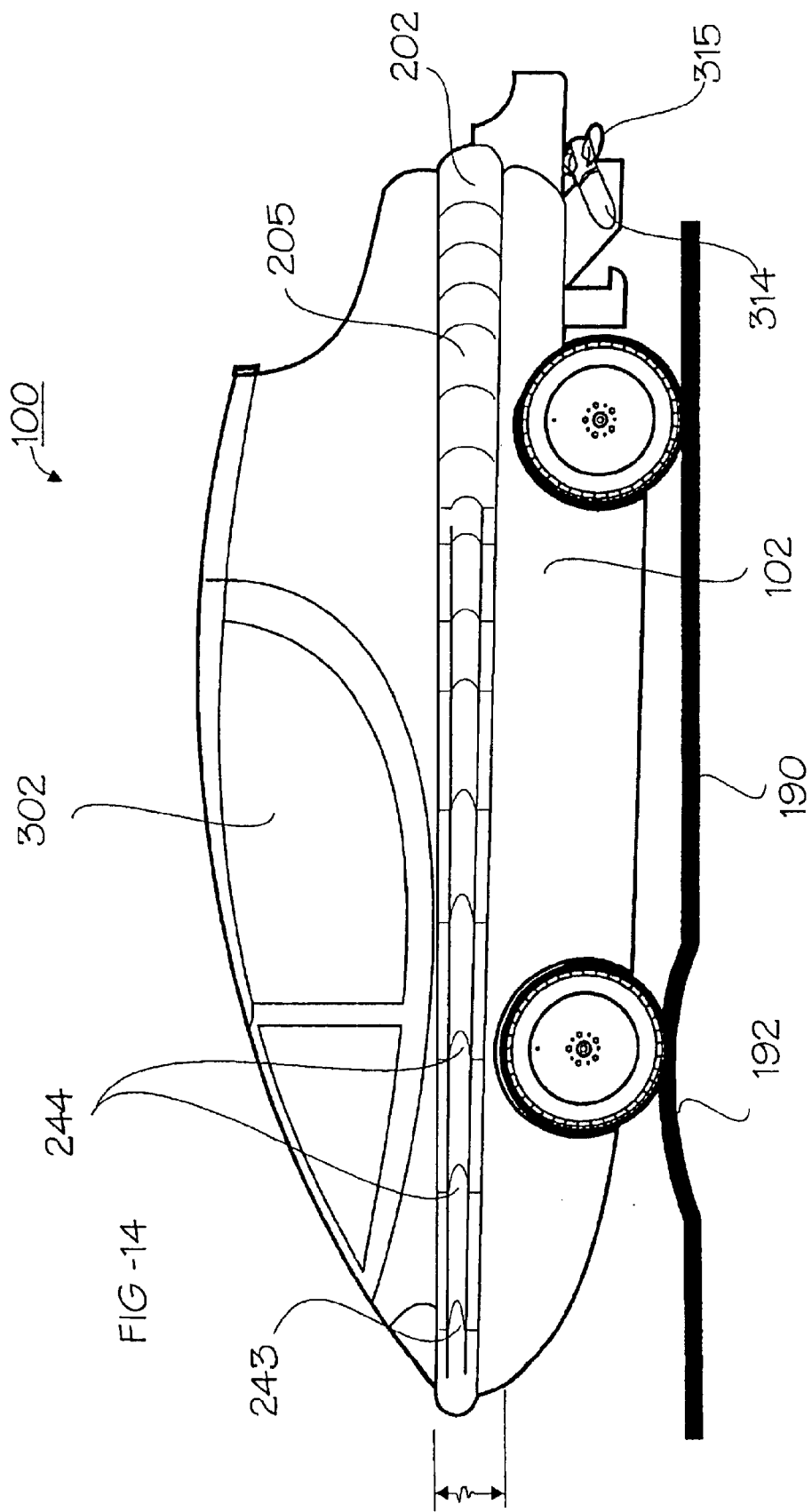
FIG. 14 is a schematic side elevational view of the amphibious vehicle shown reacting to a bump or raised road surface section.

Part of passenger compartment 302 extends into chassis cavity 130 as well as suspension cavity 230. For example as shown in FIG. 13, engine 340 is connected to passenger compartment 302 and is located within the space defined by chassis cavity 130 and suspension cavity 230. Engine 340 is part of the sprung weight of the vehicle and is fluidly connected to the drive components via forward drive shaft 342 and rear drive shaft 344. Additionally, the floor of passenger compartment 302 as well as the seats and instrumentation and other components extend into chassis cavity 130 and suspension cavity 230.

Figure 11:
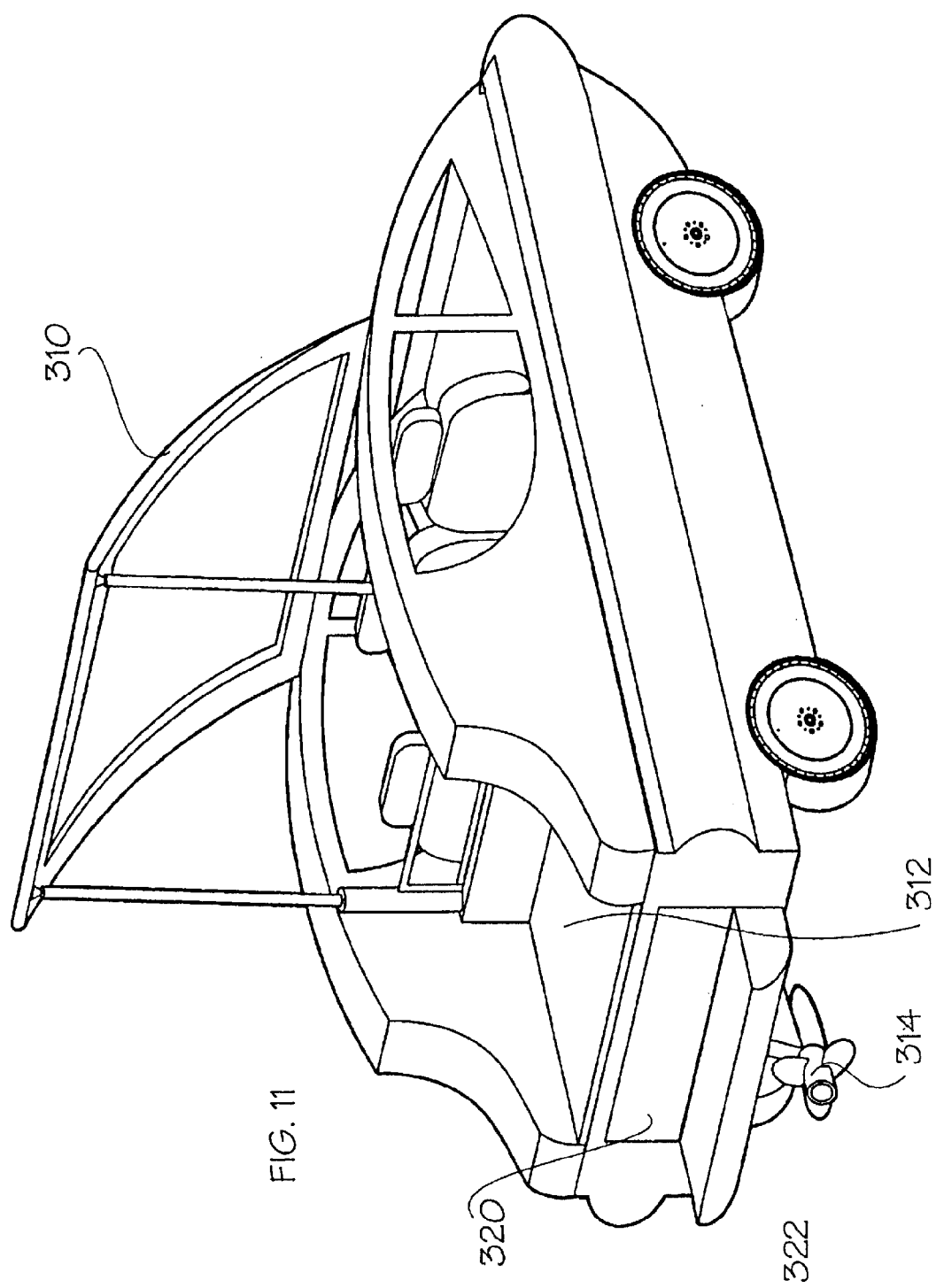
FIG. 11 is a schematic rear perspective view of the present invention showing the tilting roof mechanism.
Figure 12:
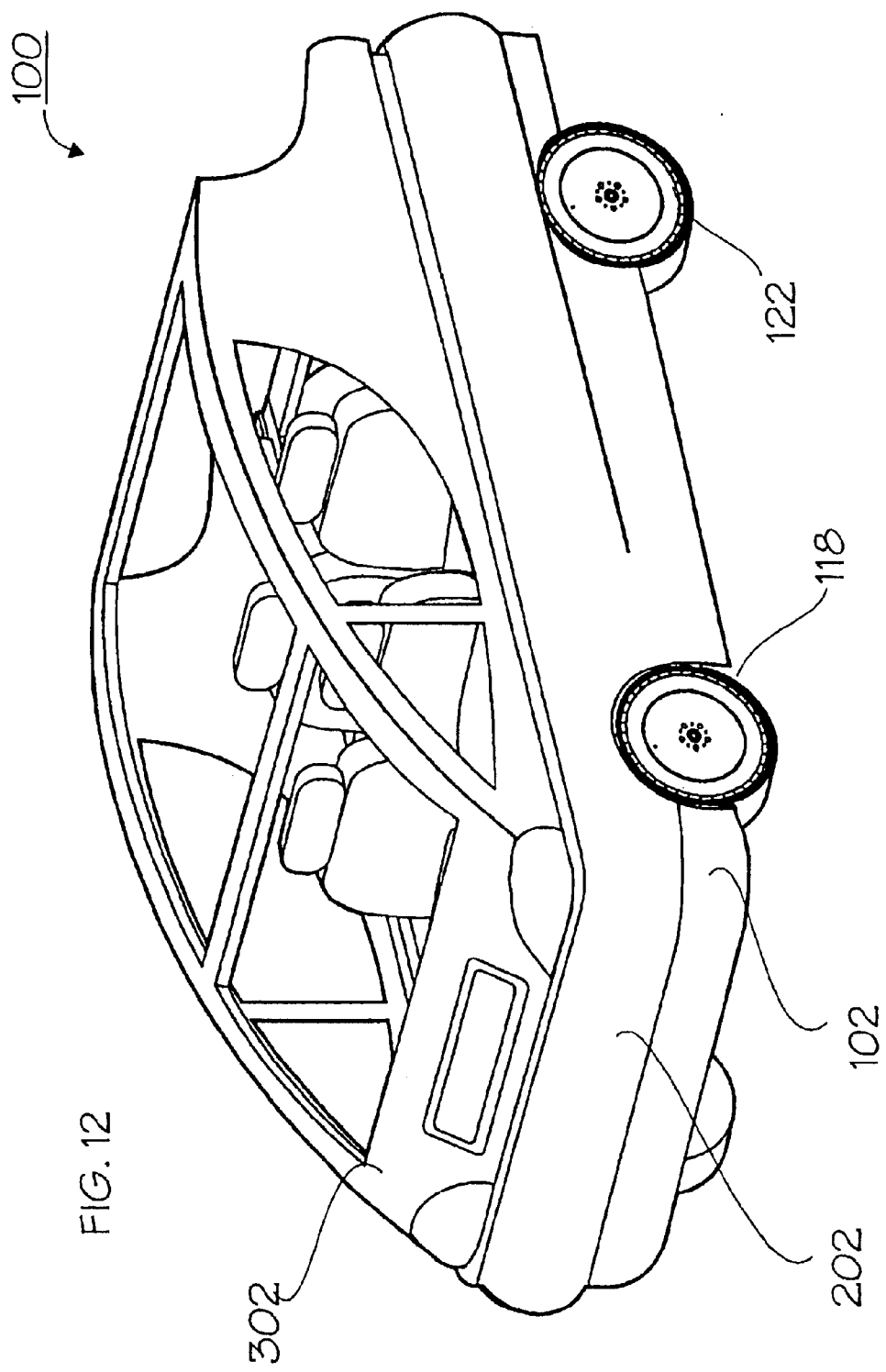
FIG. 12 is a front perspective schematic view of the present invention an amphibious vehicle.

As shown in FIG. 11, passenger compartment 302 includes a tilting roof 310 which can be opened as shown in FIG. 11. Passenger compartment 302 has a rear entry which is assessable from an entry way platform 312. Optionally, passenger compartment 302 may include trunk compartment 320 having a trunk door 322.

In Use

Amphibious vehicle 100 can be driven on land and/or can be launched into the water and utilized as a motorized land or floating vessel.

On land amphibious vehicle 100 is driven by an engine 340 which is connected to passenger compartment 302 and situated within chassis cavity 130 and suspension cavity 230. Engine 340 is mechanically coupled to the front wheels via forward drive shaft 342 and this would be coupled to a differential (not shown) to drive front wheels 118 of amphibious vehicle 100.

There is no reason why this vehicle could not also be all wheel driven, however in the preferred embodiment shown in the drawings, the vehicle is front wheel driven, wherein front wheels 118 are driven through a traditional drive line which is well known in the art via engine 340 and forward drive shaft 342. Standard components would be used in order to complete the drive line making this vehicle a front wheel drive vehicle.

Figure 16:
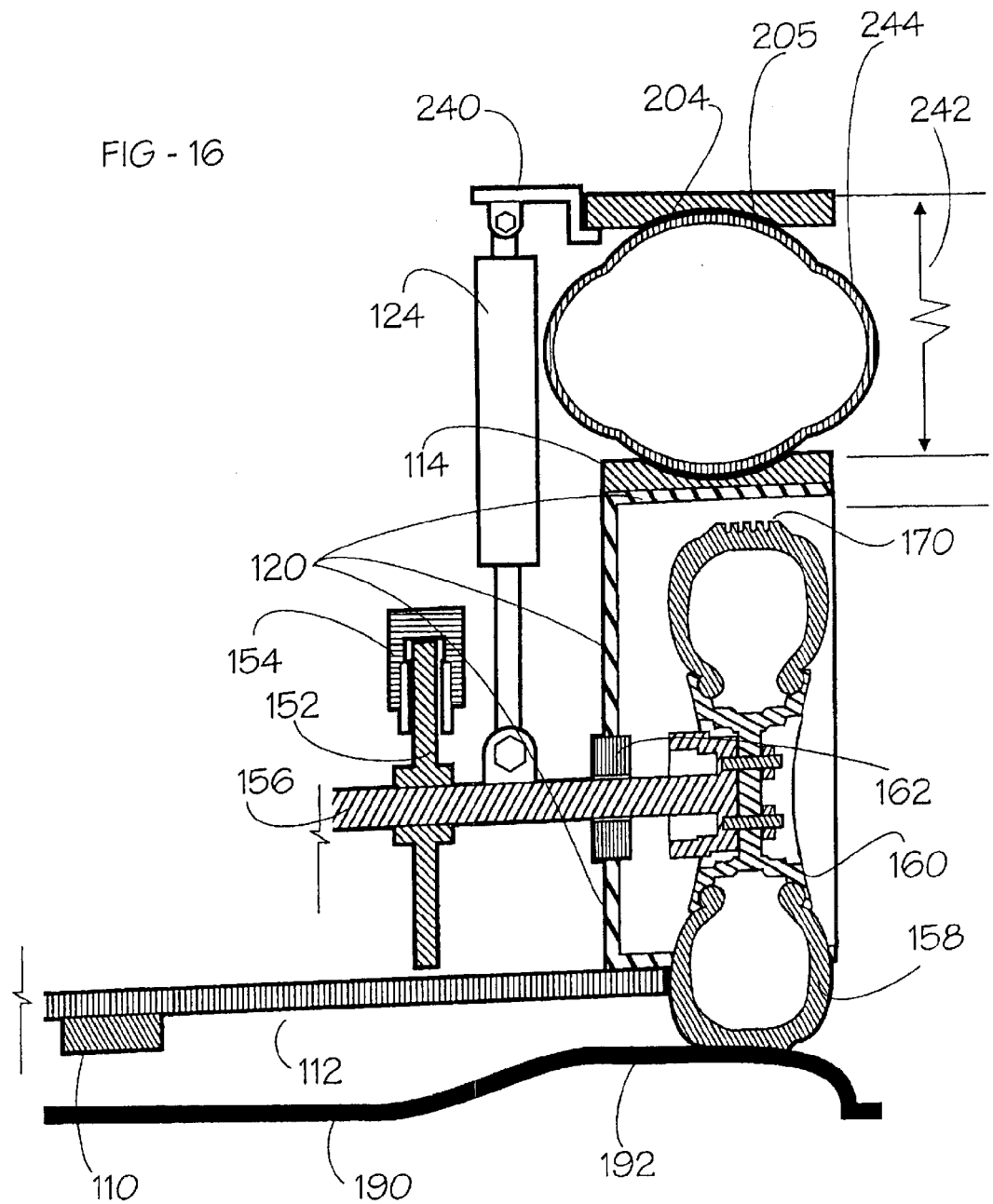
FIG. 16 is a schematic cross-sectional view of the rear suspension shown travelling over raised road surface or a bump in the road, cross section taken along lines 15—15 of FIG. 5.
Figure 17:
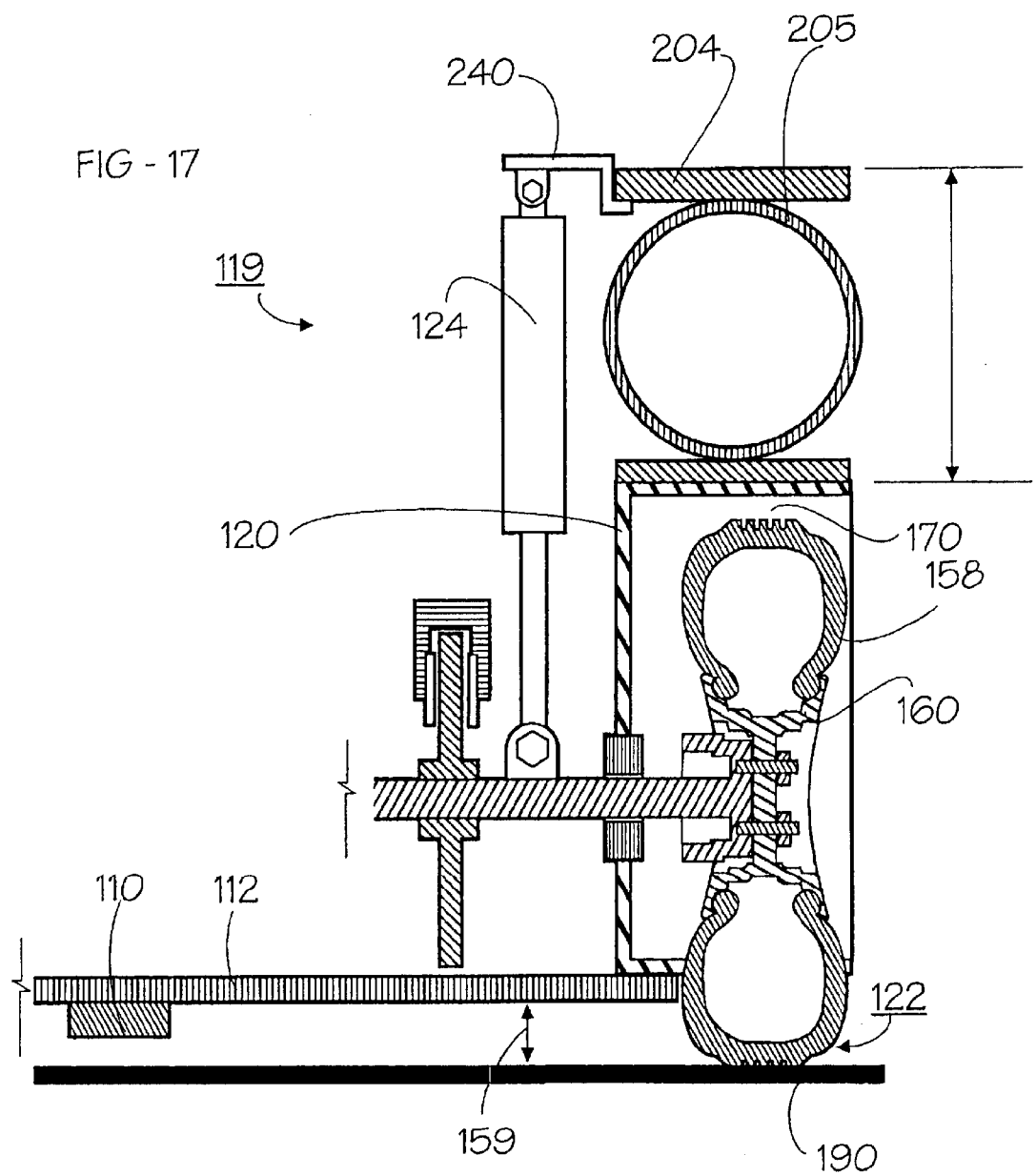
FIG. 17 is a schematic cross-sectional view taken through the rear axle with the tires travelling over a flat road surface. The cross section taken along lines 15—15 shown in FIG. 5.
Figure 18:
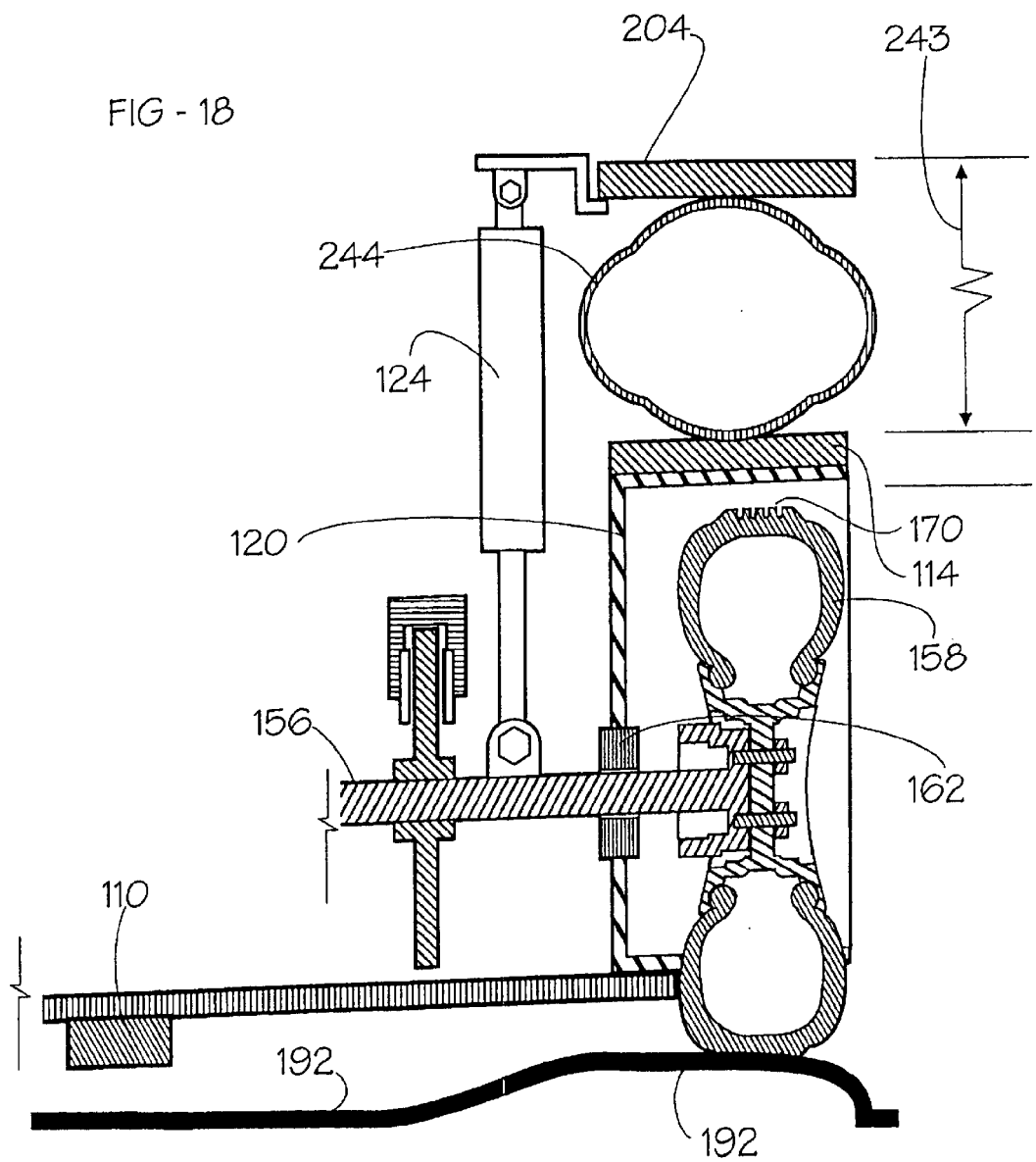
FIG. 18 is a schematic cross-sectional view of the rear suspension shown travelling over raised road surface or a bump in the road, cross section taken along lines 15—15 of FIG. 5.
Figure 19:
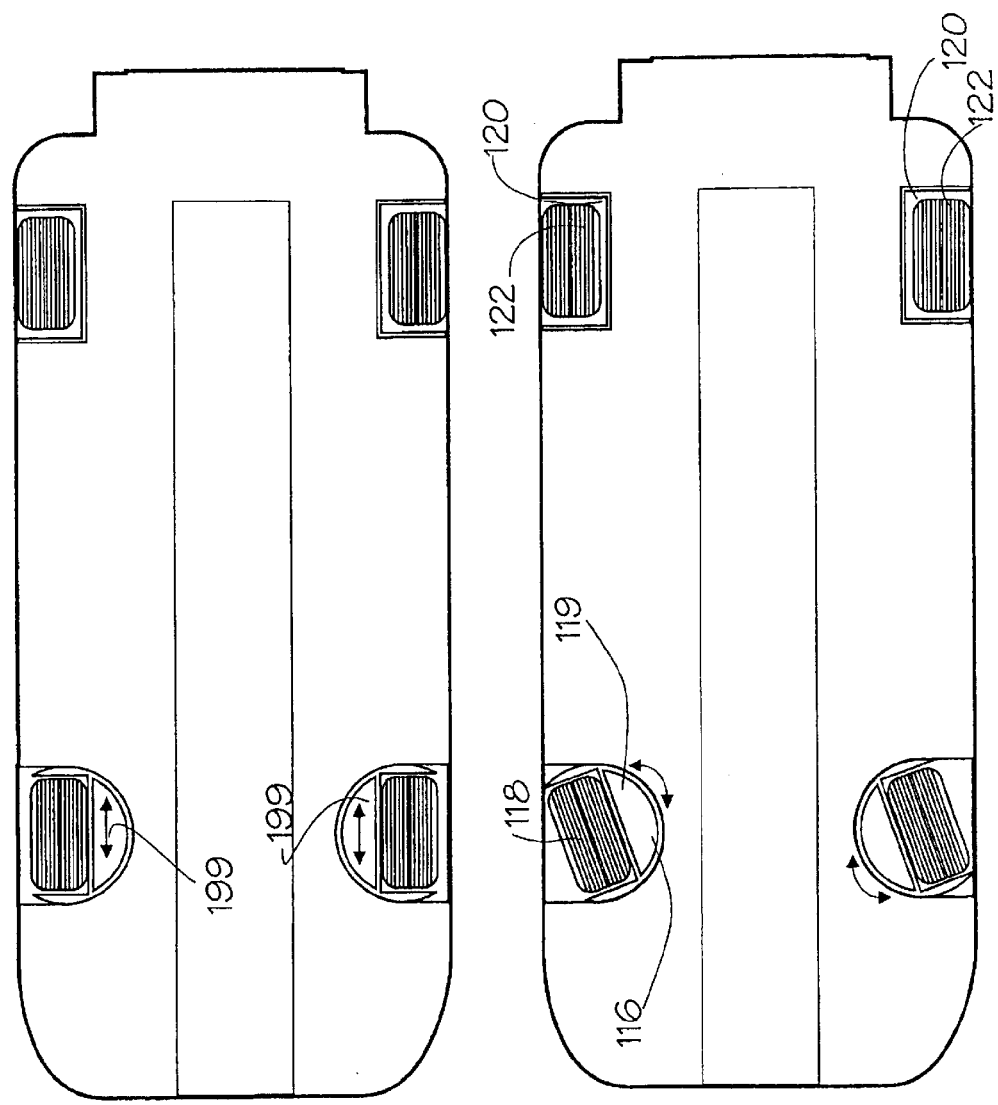
FIG. 19 is a schematic bottom plan view of the amphibious vehicle showing front wheels in straight and turned attitudes.

A person skilled in the art will note that front wheels 118 as well as rear wheels 122 have very small clearance 170 between front wheel wells 116 and the front wheels 118 and as well between the rear wheel wells 120 and the rear wheels 122. Referring now to FIGS. 15 and 16, this is defined as clearance 170 and regardless of whether the vehicle is travelling over a rough surface, this clearance 170 remains substantially unchanged. Suspension travel occurs between the chassis 102 and the passenger compartment 302, wherein the suspension 202 consists of gas filled cushion 205 extending around to outer periphery of chassis 102. Therefore, shock 124 extends between axle 156 and upper cushion support 204 and as the vehicle encounters a raised road surface or bump as shown as 192 in FIG. 16 as well as in FIG. 14, cushion 205 deforms as shown in cross-section view in FIG. 16 and in a side elevational view in FIG. 14 creating a bulging 244 which places cushion 205 into compressed position 243.

Normally cushion 205 is in the extended position 242 as shown in FIG. 15. Bulging 244 occurs when vehicle 100 encounters a raised road surface 192 as shown in FIG. 16 and in FIG. 14. The mechanical components found within rear wheel well 120 as shown in FIG. 15 and 16 are isolated from chassis cavity 130 by using water proof seals 162 where axle 156 extends through rear wheel well 120. In this manner the entire frame 109 together with wheel rim 160, tire 158 and rear wheel 122 deflects upwardly deforming cushion 205 into the compressed position 243 as shown in FIG. 16 when a raised road surface 192 is encountered.

A person skilled in the art will note that the entire passenger compartment 302 is riding as though on a cushion of air created by cushion 205. It is critical that cushion 205 remain gas tight to prevent air from leaking out and/or special valving can be included (not shown in the drawings) to control entry and exit of air from cushion 205 and thereby be able to control the stiffness of the suspension.

A person skilled in the art will realize that by utilizing the presently invented chassis construction 102 as shown, that water proofing the drive line components becomes much simpler because the clearance 170 between the wheels and the wheel wells can be made much smaller then on conventional suspension systems. Therefore the road clearance 159 can be made much smaller than conventional cars. The advantageous of this system is evident particularly when the vehicle is used as a floating vessel.

Amphibious vehicle 100 can also be launched into water and used as a motorized vessel. In this case stern drive 314 is lowered into a drive position and through a selective transmission, power is diverted from forward drive shaft 342 to rear drive shaft 344 which in turn powers stern drive 314 turning propeller 315. Amphibious vehicle 100 floats readily and flexible outer covering 232 covers the entire outer surface of chassis 102 and suspension 202 ensuring that water does not enter into chassis cavity 130 and suspension cavity 230. Water can enter into wheel wells 120 and 116, and around front wheel deflection plates 199, wheel deflection plates 199 operate to cover the wheel well opening and yet accommodate side to side movement of front wheels during steering operations, thereby minimizing water resistance as vehicle 100 travels along the water. The number of suspension components has been minimized within the wheel wells. The suspension arrangement described above, defining road clearance 159 or the distance between the bottom of chassis 102 and the tire surface is significantly less than a traditional vehicle and therefore the amount of tire restricting the movement of water and therefore the restriction of movement of amphibious vehicle 100 through water has been minimized.

In addition, cushions 205 provide for positive buoyancy of amphibious vehicle 100 should there be a breach or a leak or a break that occurs in flexible outer covering 232 ensuring that the vehicle may continue to float through the water even if there is water entering into chassis cavity 130 and suspension cavity 230.

It should be apparent to persons skilled in the arts that various modifications and adaptation of this structure described above are possible without departure from the spirit of the invention the scope of which defined in the appended claim.

I claim:

1. An amphibious vehicle for use on land and on water comprising:
    a) a lower chassis section including a means for rollably supporting the vehicle's weight on land, and a means for hydrodynamically supporting the vehicles weight on water;
    b) an upper passenger compartment section including a means for housing at least one passenger and a means for attaching drive line components thereto;
    c) a suspension section sandwiched between said passenger compartment and said chassis section, said suspension section including a suspension means for absorbing and smoothing bumps and irregularities encountered on road surfaces or on water;
    d) said drive line including a drive means for propelling said vehicle on land or on water;
    e) wherein said suspension means includes a resilient member sandwiched between said passenger compartment and said chassis section; and
    f) wherein said resilient member includes gas filled cushions extending around the periphery of said vehicle, wherein said cushions being disposed between said passenger compartment and said chassis section.

2. The amphibious vehicle claimed in claim 1 wherein said means for rollably supporting including wheels housed within wheel wells, wherein a clearance between said wheels and said wheel wells remains substantially constant.

3. The amphibious vehicle claimed in claim 2 wherein said wheel wells are water tight preventing water from entering into a chassis cavity.

4. The amphibious vehicle claimed in claim 2 wherein said wheel wells including front wheel wells which further include deflector plates disposed behind each front wheel for operatively deflecting water away from the front wheel wells and to cooperatively turn in unison with said front wheels thereby minimizing the resistance to travelling through water.

5. The amphibious vehicle claimed in claim 1 wherein front wheels are operatively adapted to turn for effecting steering control on land.

6. The amphibious vehicle claimed in claim 1 wherein said drive means includes a marine stern drive which is adapted to be lowered into water propelling said vehicle on water.

7. The amphibious vehicle claimed in claim 1 wherein said drive means includes coventional drive components for turning said front wheels for propelling said vehicle on land.

8. An amphibious vehicle for use on land and on water comprising:
    a) a lower chassis section including a means for rollably supporting the vehicle's weight on land, and a means for hydrodynamically supporting the vehicles weight on water;
    b) an upper passenger compartment section including a means for housing at least one passenger and a means for attaching drive line components thereto;
    c) a suspension section sandwiched between said passenger compartment and said chassis section, said suspension section including a suspension means for absorbing and smoothing bumps and irregularities encountered on road surfaces or on water;
    d) said drive line including a drive means for propelling said vehicle on land or on water;
    e) wherein said suspension means includes a resilient member sandwiched between said passenger compartment and said chassis section; and
    f) wherein said resilient members include air filled cushions extending around the periphery of said vehicle, wherein said cushions being disposed between said passenger compartment and said chassis section.

9. The amphibious vehicle claimed in claim 8 wherein said means for rollably supporting including wheels housed within wheel wells, wherein a clearance between said wheels and said wheel wells remains substantially constant.

10. The amphibious vehicle claimed in claim 8 wherein road or water irregularities are smoothed and absorbed by compression or expansion of said air filled cushions.

11. The amphibious vehicle claimed in claim 8 wherein said air filled cushions are sandwiched between lower cushion supports attached to said chassis and upper cushion supports attached to said passenger compartment.

12. An amphibious vehicle for use on land and on water comprising:
    a) a lower chassis section including a means for rollably supporting the vehicle's weight on land, and a means for hydrodynamically supporting the vehicles weight on water;
    (b) an upper passenger compartment section including a means for housing at least one passenger and a means for attaching drive line components thereto;
    c) a suspension section sandwiched between said passenger compartment and said chassis section, said suspension section including a suspension means for absorbing and smoothing bumps and irregularities encountered on road surfaces or on water;
    d) said drive line including a drive means for propelling said vehicle on land or on water; and
    e) wherein said drives means includes engine and transmission components hung from said passenger compartment by said attaching means wherein said engine and transmission disposed within a suspension cavity and chassis cavity defined by said suspension and chassis sections.

13. An amphibious vehicle for use on land and on water comprising:
    a) a lower chassis section including a means for rollably supporting the vehicle's weight on land, and a means for hydrodynamically supporting the vehicles weight on water;

b) an upper passenger compartment section including a means for housing at least one passenger and a means for attaching drive line components thereto;

c) a suspension section sandwiched between said passenger compartment and said chassis section, said suspension section including a suspension means for absorbing and smoothing bumps and irregularities encountered on road surfaces or on water;

d) said drive line including a drive means for propelling said vehicle on land or on water; and e) wherein said hydrodynamic means includes a flexible outer covering being a flexible membrane covering said chassis for preventing water entry into said vehicle and defining a water entry hull.

* * * * *